(12) United States Patent
Woronecki et al.

(10) Patent No.: US 6,526,896 B2
(45) Date of Patent: Mar. 4, 2003

(54) MULTI-POSITIONAL MOUSE PAD

(75) Inventors: Peter Woronecki, Holland Landing (CA); David Ambrose Parshad, Markham (CA); John R. Edwards, Nobleton (CA)

(73) Assignee: Inscape Corporation, Newmarket (CA)

( * ) Notice: Subject to any disclaimer, the term of this patent is extended or adjusted under 35 U.S.C. 154(b) by 0 days.

(21) Appl. No.: 09/834,937

(22) Filed: Apr. 16, 2001

(65) Prior Publication Data

US 2002/0104947 A1 Aug. 8, 2002

(30) Foreign Application Priority Data

Feb. 5, 2001 (CA) ................................................ 2334143

(51) Int. Cl.[7] .............................................. A47B 57/00
(52) U.S. Cl. ...................... 108/95; 108/96; 248/118.1; 248/918; 312/223.1
(58) Field of Search ........................ 312/208.1, 223.3; 108/50.02, 92, 94, 95, 96, 138; 248/118, 118.1, 918

(56) References Cited

U.S. PATENT DOCUMENTS

| 4,666,118 A |   | 5/1987 | Busche |   |
|---|---|---|---|---|
| 4,863,124 A | * | 9/1989 | Ball et al. | 108/94 |
| 5,240,215 A | * | 8/1993 | Moore | 108/10 |
| 5,351,897 A | * | 10/1994 | Martin | 248/118 |
| 5,377,598 A | * | 1/1995 | Kirchner et al. | 108/137 |
| 5,412,294 A | * | 5/1995 | Anzai | 318/139 |
| 5,443,237 A |   | 8/1995 | Stadtmauer |   |
| 5,564,667 A |   | 10/1996 | Copeland et al. |   |
| 5,636,822 A |   | 6/1997 | Hendershot et al. |   |
| 5,730,408 A |   | 3/1998 | McAllister |   |
| 5,771,814 A |   | 6/1998 | Clausen |   |
| 5,823,487 A |   | 10/1998 | Kirchhoff |   |
| 5,832,840 A |   | 11/1998 | Woof |   |
| 5,836,575 A | * | 11/1998 | Robinson et al. | 108/138 |
| 5,848,773 A |   | 12/1998 | Bourassa |   |
| 5,995,082 A |   | 11/1999 | Lakoski |   |
| 6,003,446 A |   | 12/1999 | Leibowitz |   |
| 6,042,064 A | * | 3/2000 | Hong | 248/118 |
| 6,045,098 A |   | 4/2000 | Timm |   |

* cited by examiner

*Primary Examiner*—Korie Chan
(74) *Attorney, Agent, or Firm*—Riches, McKenzie & Herbert LLP

(57) ABSTRACT

A multi-positional support mechanism for a computer mouse pad comprising a support adapted to be secured to a keyboard support tray to extend upwardly from the keyboard support tray, a bracket mounted to the support for pivoting about a generally horizontal tilt axis, and a mouse pad mounted to the bracket for pivoting about a turntable axis generally normal to the tilt axis.

21 Claims, 10 Drawing Sheets

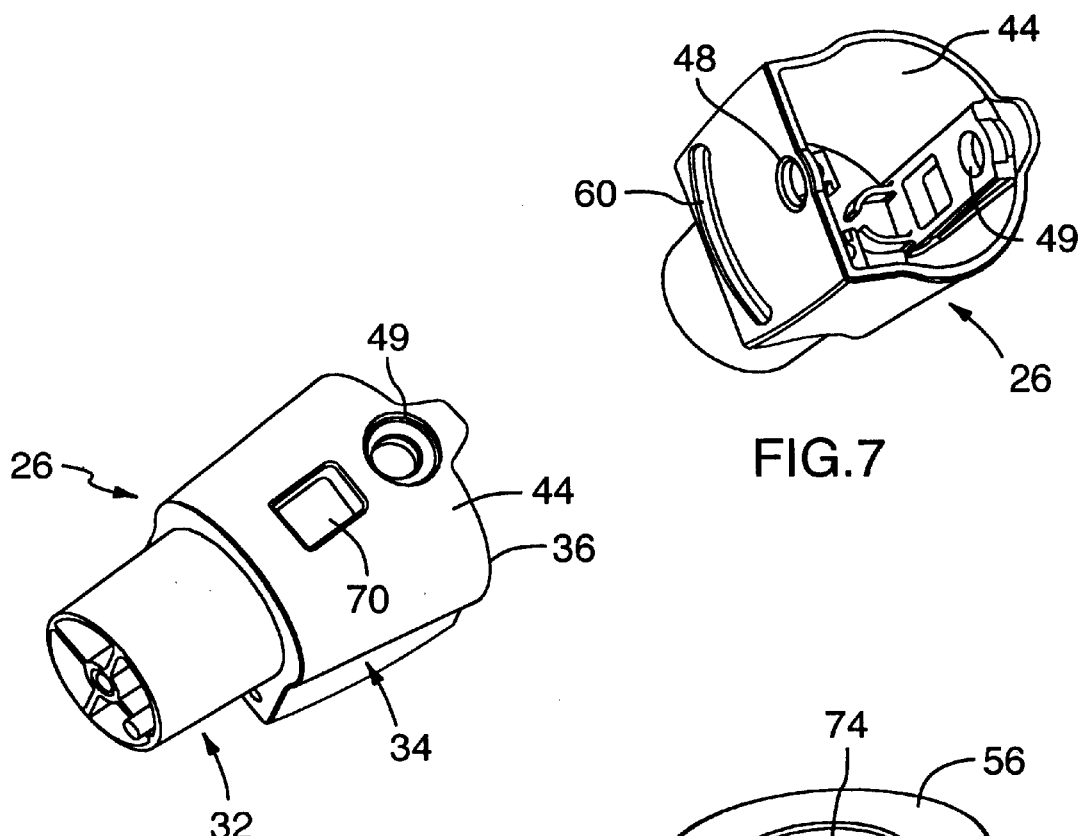
FIG.7
FIG.8
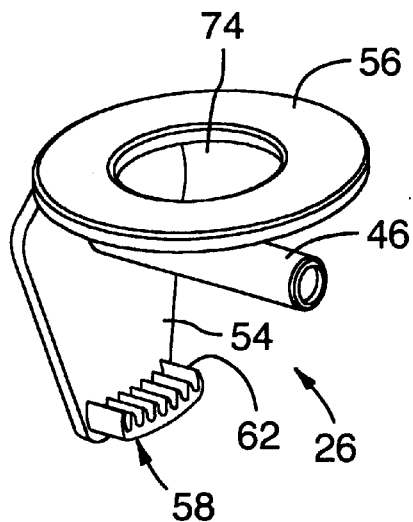
FIG.9
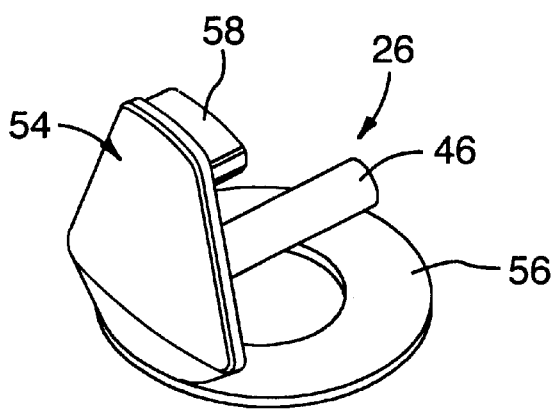
FIG.10

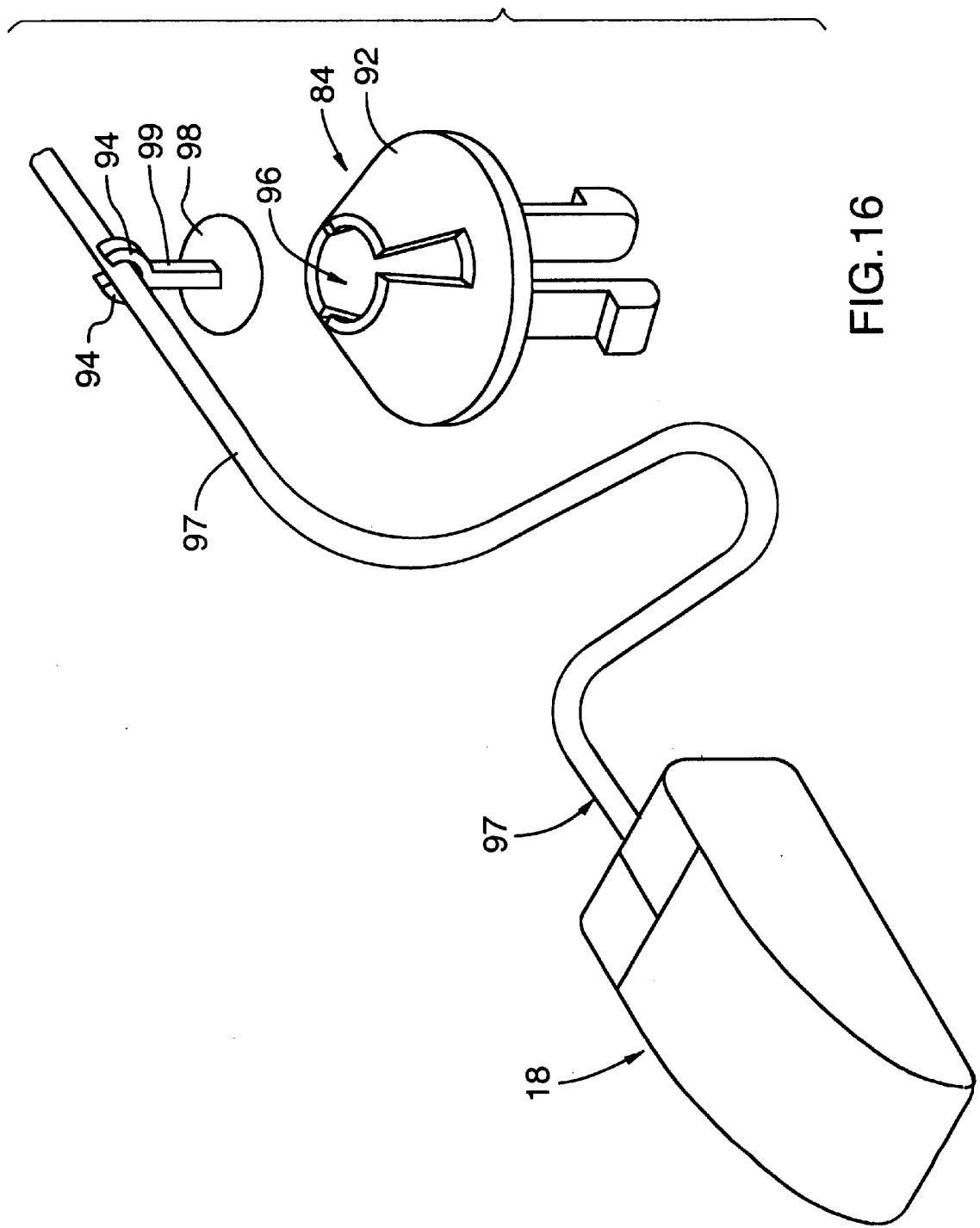

MULTI-POSITIONAL MOUSE PAD

SCOPE OF THE INVENTION

This invention relates to computer mouse pads and, more particularly, to a multi-positional mouse pad preferably supported on a keyboard support tray.

BACKGROUND OF THE INVENTION

Computer keypads and mouse are well known controllers for computers. Mouse are typically adapted to be manually movable over a mouse pad so as, for example, to move a cursor on a computer. Various devices are provided as mouse pads on which the mouse can be supported and moved and various devices are known to position mouse pads relative to the computer, relative a computer workstation, relative a keyboard, relative a keyboard support tray and/or relative person using the computer.

The previously known devices suffered the disadvantages of not providing a mouse pad which can easily be positioned in a variety of positions, which can easily be removed, which can easily be adapted for left and right usage, which can overlie the keyboard and/or which can be moved to permit use of the entire keyboard.

SUMMARY OF THE INVENTION

To at least partially overcome these disadvantages of the previously known devices, the present invention provides a multi-positional support for a computer mouse pad comprising:

a support adapted to be secured to extend upwardly from a support structure, a bracket mounted to the support for pivoting about a generally horizontal tilt axis, and a mouse pad mounted to the bracket for pivoting about a turntable axis generally normal to the tilt axis.

An object of the present invention is to provide a mouse pad, which can be moved into a variety of positions and in particular, can be tilted to varying different positions.

Another object is to provide a mouse pad, which is raised at a height above a support structure permitting a keyboard to be received underneath the mouse pad.

Another object is to provide a mouse pad which can be moved from a position in which it overlies a keyboard and particularly the numeric keypad in the right hand side of the keyboard and which can be moved to positions in which it does not overlie the numeric keypad to permit use of the numeric keypad.

Another object is to provide a keyboard support tray, which permits a multi-positional mouse pad to be located at different locations and preferably on either a left hand side or a right hand side.

The present invention provides a novel mouse pad, which is mounted on an upstanding support as in a turret like manner. The support carries a bracket which permits pivoting of the bracket relative the upright support about a tilt axis which preferably is horizontal. A mouse pad is connected to the bracket, preferably above the bracket and the support, for relative rotation of the mouse pad relative the bracket about a turntable axis substantially normal the tilt axis. The combination of the support, bracket and the mouse pad may be mounted in various manners as, for example, directly to a desktop, either dependent or independent of a keyboard or to a keyboard support tray. Preferably, the combination of the support, bracket and mouse pad is mounted juxtapositioned to a keyboard such that the mouse pad may overlie a portion of a keyboard. Preferably, the mouse pad is asymmetrical about the turntable axis such that on rotation of the mouse pad about the turntable axis, the mouse pad will assume positions in which it either overlies a numeric keypad or does not overlie the numeric keypad. Preferably, a keyboard support tray is provided having a socket to receive the support such that the support, bracket and mouse pad may be removable coupled to the keyboard support tray. The keyboard support tray may preferably have at least two sockets for receipt of the mouse pad support such that a mouse pad can be located for either left and right hand use.

In accordance with one aspect, the present invention provides a multi-positional support for a computer mouse pad comprising:

a support adapted to be secured to extend upwardly from a support member, a bracket mounted to the support for pivoting about a generally horizontal tilt axis, a mouse pad mounted to the bracket for pivoting about a turntable axis generally normal to the tilt axis.

In another aspect, the present invention provides a computer keyboard support with a multi-positional mouse pad comprising:

a keyboard support tray adapted to support a keyboard thereon;

a support extending upwardly from the keyboard support tray;

a bracket mounted to the support for pivoting about a generally horizontal tilt axis; and a mouse pad mounted to the bracket for pivoting about a turntable axis generally normal to the tilt axis.

BRIEF DESCRIPTION OF THE DRAWINGS

Further aspects and advantages of the present invention will be become apparent from the following description taken together with the accompanying drawings in which:

FIGS. 7 and 8 are pictorial views of a mouse pad support in accordance with the embodiments of FIGS. 1 to 6;

FIGS. 9 and 10 are two pictorial views of a top and bottom of a mouse pad bracket in accordance with the embodiments of FIGS. 1 to 6;

FIG. 16 is a schematic pictorial view of a second embodiment of a wire clip.

DETAILED DESCRIPTION OF THE DRAWINGS

A combined keyboard support tray and mouse pad device generally indicated as 10 is shown in FIGS. 1 to 5 in accordance with the preferred embodiment of the present invention.

Device 10 provides a keyboard support tray 12 for supporting a keyboard 14 and a mouse pad 16 providing a surface to support and receive a computer mouse 18.

Figure 1:
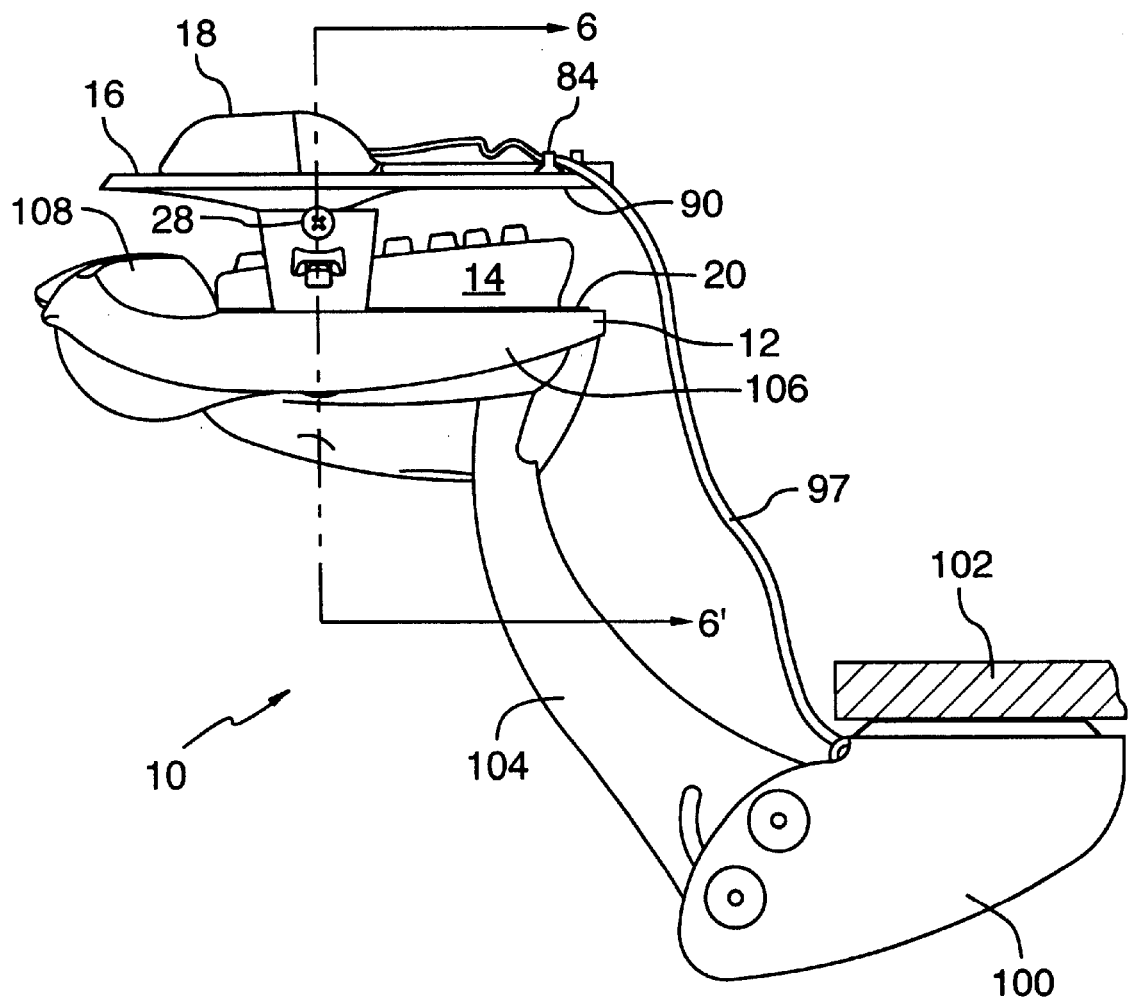
FIG. 1 is a side view of a combined keyboard support tray and mouse pad device in accordance with a preferred embodiment of the present invention and showing a keyboard supported thereon.

Device 10 includes tray mounting mechanism including a bracket 100 mounted to the undersurface of a desktop 102 only shown in FIG. 1. An arm 104 extends from bracket 100 to support the keyboard support tray 12. Such tray mounting mechanisms are well known, as for example, taught in U.S. Pat. No. 5,351,897 to Martin, issued Oct. 4, 1994, the disclosure of which is incorporated herein. Such tray mounting mechanisms frequently provide for mounting at different heights relative the desktop 102 and with the keyboard support tray 12 disposed at different angulations as relative a horizontal tray pivot axis 106 in FIG. 1.

The support tray 12 has an upwardly directed support surface 20 adapted to receive the keyboard 14 thereon. Preferably, a soft elastomeric wrist pad 108 is provided on the support tray 12 in front of the keyboard 14.

The mouse pad 16 is supported on the keyboard support tray 12.

Figure 6:
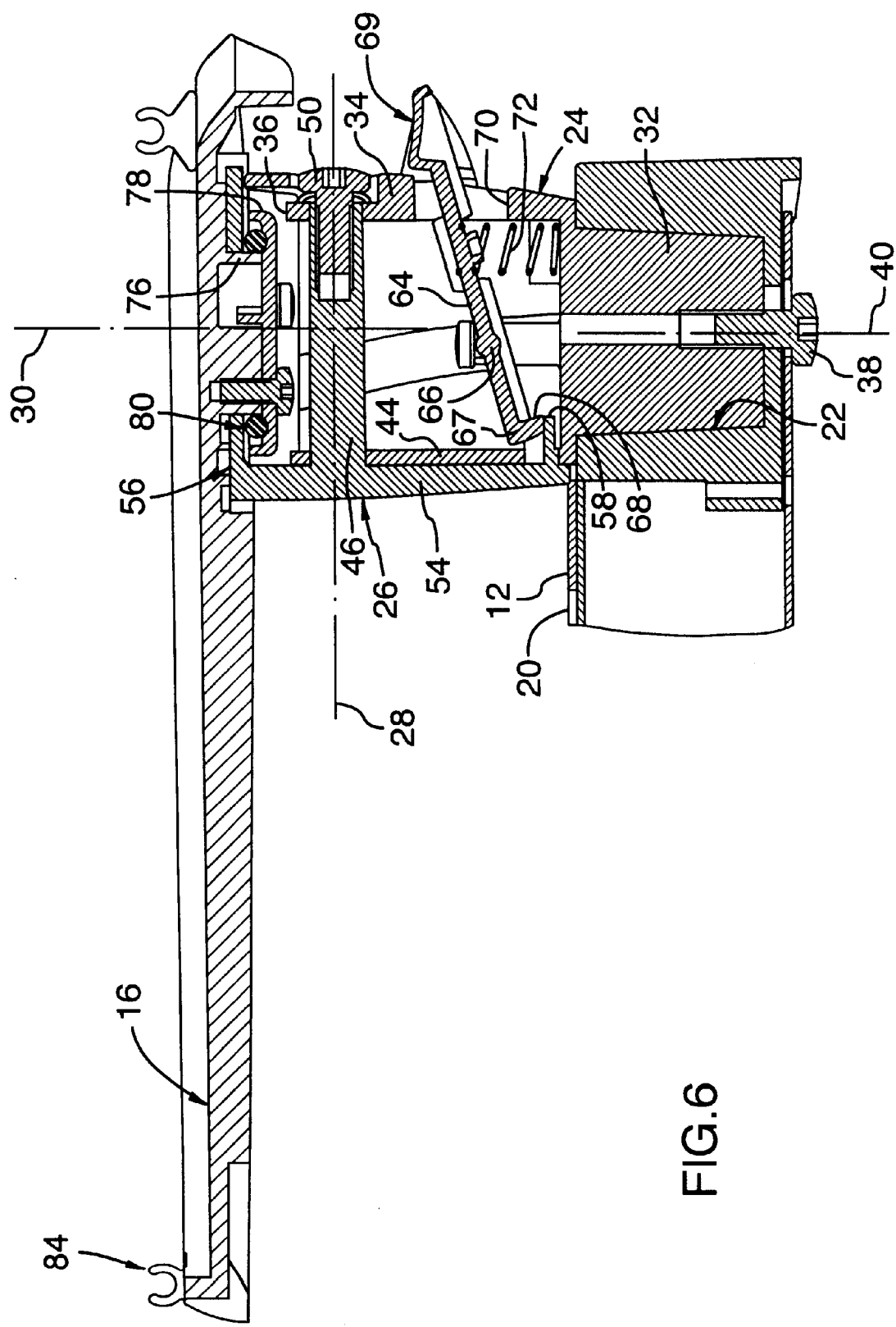
FIG. 6 is a schematic cross-sectional side view on section line 6–6' in FIG. 1.

As best seen in FIG. 6, a mouse pad support 24 is received in a socket 22 in tray 12. A bracket 26 is mounted to the support 24 for pivoting about a tilt axis 28. The mouse pad 16 is mounted to bracket 26 for pivoting about a turntable axis 30 generally normal the tilt axis 28.

The support 24 is shown as a generally elongate member having a plug 32 at a lower end and an upper body 34 which extends upwardly to an upper end 36. The plug 32 is removable received in the socket 22 secured therein as by a screw 38. The socket 22 opens upwardly and the plug 32 can be inserted and removed from above the tray 12. The socket 22 is generally disposed about a socket axis 40 generally normal to the upper surface 20 of the tray 16. Preferably, the plug 32 may be received in socket 22 fixed in one of a plurality of positions rotated about socket axis 40 preferably in a position as shown with the tilt axis 28 parallel a front edge 42 of the keyboard support surface 20. The plug 32 may be received in the socket 22 in a number of different positions as with a radially outwardly key on the plug being received in one of a number of axially extending keyways in the socket 22.

The upper body 34 of the support 24 extends upwardly above the surface 20 as a hollow body defined by circumferential side wall 44. Bracket 26 is journalled to upper body 34 by an axle member 46 on the bracket 26 being journalled in bearing openings 48 and 49 located diametrically opposite each other in the side wall 44. The axle member 46 is held in the openings by screw 50 and a friction-inducing washer.

Bracket 26 carries a side leg plate 54 which extends along one side of the side wall 44 of the upper body 34 supported on axle member 46. Leg plate 54 extends upwardly to a top plate 56 of the bracket 26 which overlies the upper end 36 of the support 24 and carries the mouse pad 16.

Leg plate 54 extends downwardly to a foot 58 which extends radially into the upper body 34 inwardly through an arcuate slot 60 in sidewall 44 and provides a plurality of upwardly directed catch teeth 62.

A lever 64 is mounted to the support 24 for pivoting about a lever fulcrum axis 66. The lever 64 has an inner end 67 which carries a plurality of catch teeth 68 to engage with the catch teeth 62 on the foot 58 of the leg plate 54. The outer end 69 of the lever 64 extends outwardly from the upper body 34 by passing through an aperture 70 in side wall 44. A helical coil spring 72 biases the lever 64 counterclockwise about the fulcrum axis 66 urging the catch teeth 68 and 62 to engage and the outer end 69 of the lever 68 to move upwardly.

Figure 4:
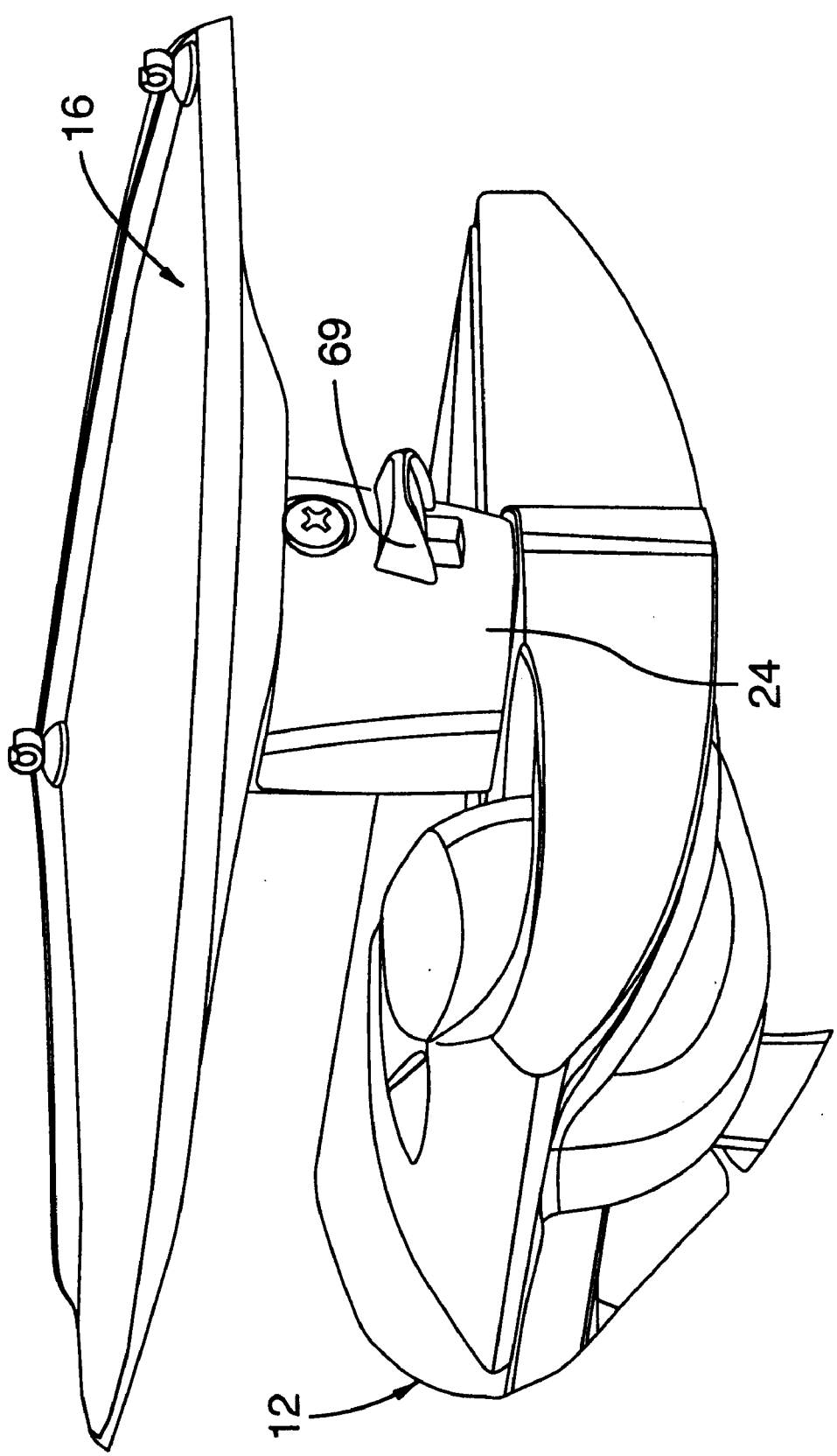
FIG. 4 is a partially cut away pictorial view of the front right hand corner of the keyboard support tray and mouse pad of FIG. 1 as seen from above.
Figure 5:
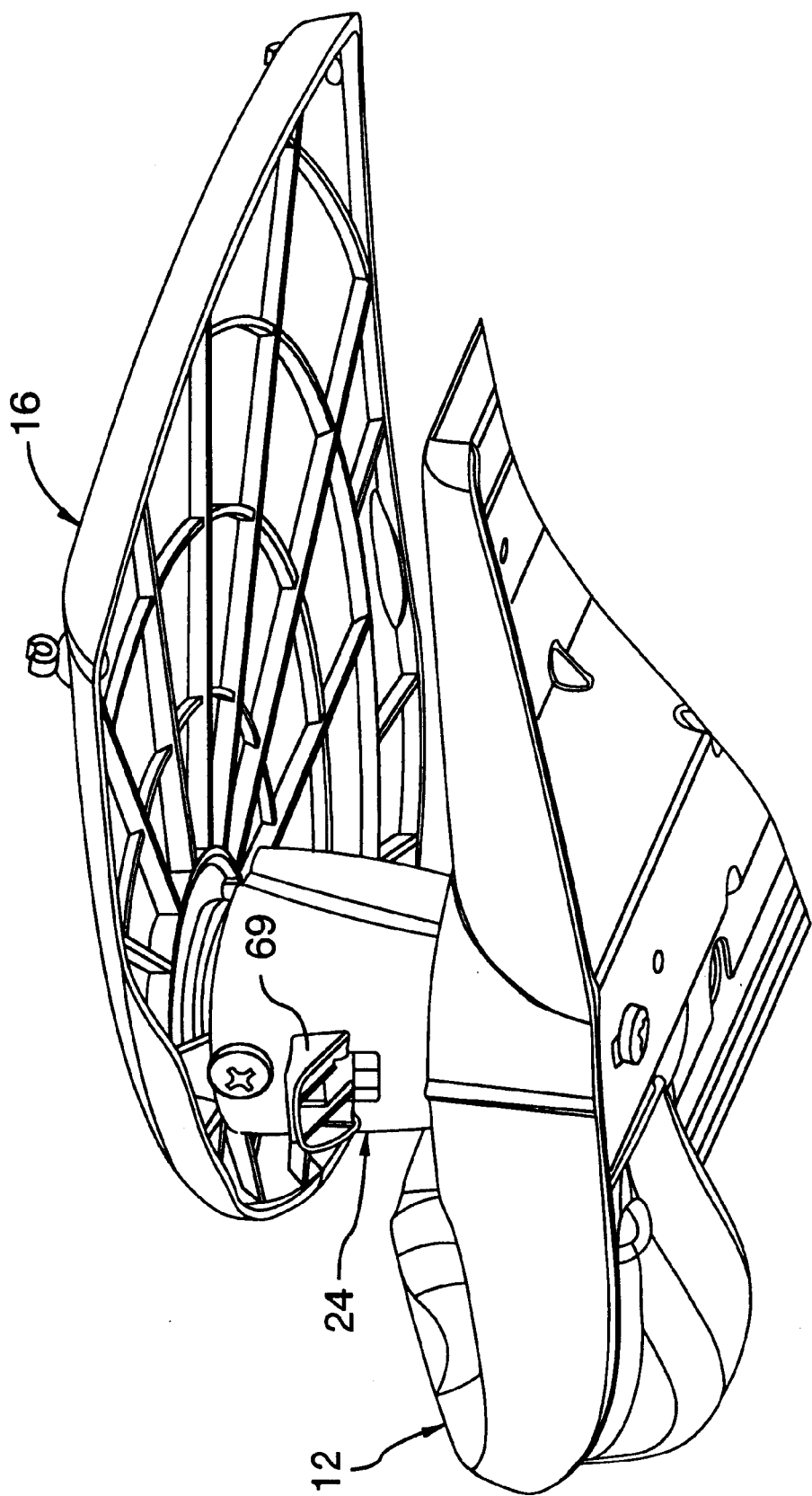
FIG. 5 is a partially cut away pictorial view of the right hand corner of the keyboard support tray and mouse pad of FIG. 1 as seen from below.

As best seen in FIG. 4, the outer end 69 of lever 64 is disposed at a location outside the support 24 accessibly for manual engagement by a user. A user can depress the outer end 69 of the lever to disengage the catch teeth 68 and 62 thus unlocking the bracket 26 from the support 24 and permitting tilting of the bracket 26 relative the support 24 to a desired position. On release of the lever 64 by a user, the lever will lock the bracket 26 to the socket 24 in a new position by re-engagement of the catch teeth 68 and 62. Sufficiently small size catch teeth 68 and 62 can provide for small incremental variation of the tilt angle about the tilt axis 28.

The ring-like top plate 56 of the bracket 26 is coupled to the mouse pad 16 via a turntable mechanism. In this regard, the top plate 56 has a circular opening 74 therein. The mouse pad 16 carries a downwardly extending cylindrical stub axle 76 which is received and journalled in the opening 74 for pivoting about the turntable axis 30. A connection cap 78 is secured to the axial end of the stub axle 76 and frictionally captures an O-ring 80 between an under surface of the plate 56 and an upper surface of the connection cap 78, so as to provide frictional resistance to rotation of the mouse pad 16 relative the bracket 24 unless rotational forces are applied to urge the mouse pad to rotate about the turntable axis 30 greater than the initial force required to overcome the friction.

Figure 2:
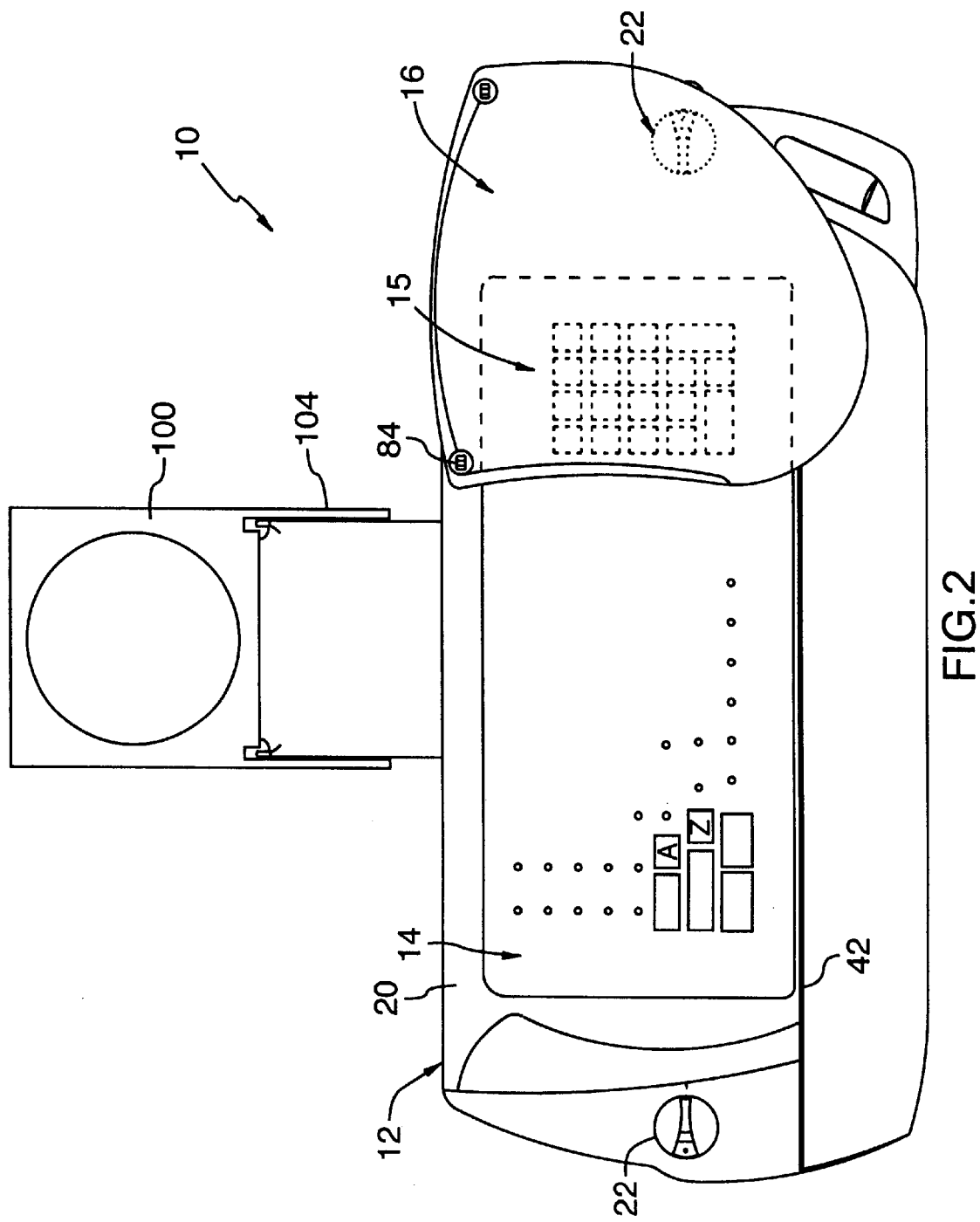
FIGS. 2 and 3 are top views and front views of the keyboard support tray and mouse pad shown in FIG. 1.
Figure 3:
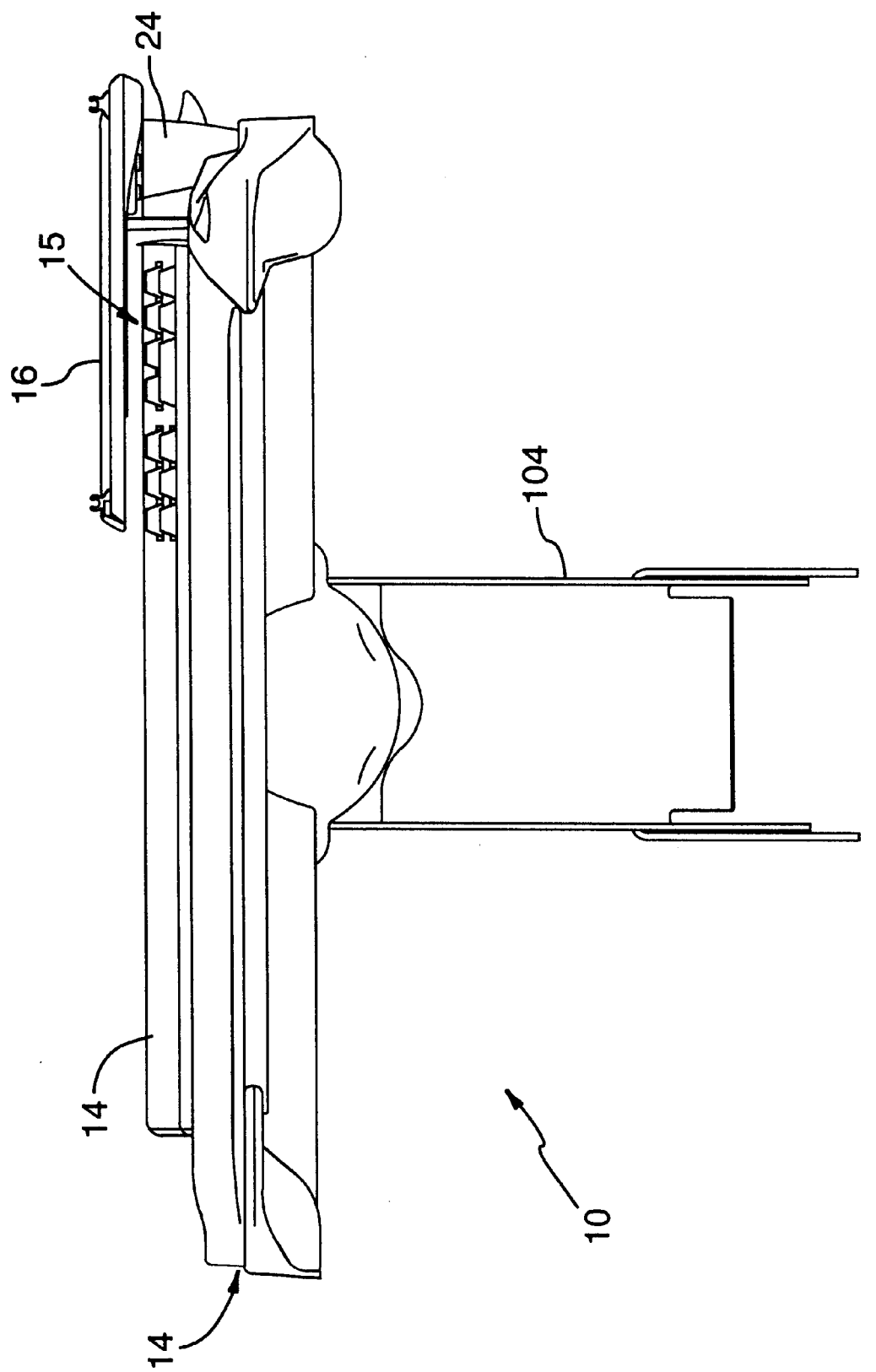

Reference is made to FIG. 2 which shows the keyboard 14 as having two separate sockets 22, one in the left hand side of the tray and the other shown in dashed lines on the right hand side of tray 12 and in which the mouse pad 16 is shown as supported. Both sockets are preferably identical and the mouse pad support 24 may be removed from one socket and placed in the other so as to permit use of a mouse on a mouse pad 16 located either on the left or right hand side. While less preferred, it is possible that two separate mouse pads 16 could be supported at the same time.

The keyboard support tray 12 is shown in top view in FIG. 2 as having a keyboard 14 supported thereon. The area underlying the keyboard support tray 12 may be designated as a keyboard area and the other area of the keyboard 14 may be designated a peripheral or border area. Preferably, one or more sockets 22 are provided in the border area so that the mouse pad tower including the mouse pad 16, mouse pad bracket 26 and mouse pad support 24 may be moved from one socket 22 to another without interfering with the keyboard 14. The keyboard 14 has a front end which is shown as straight and preferably is parallel to the tray pivot axis 106 as is the front end 42 of the keyboard support surface 20.

Figure 11:
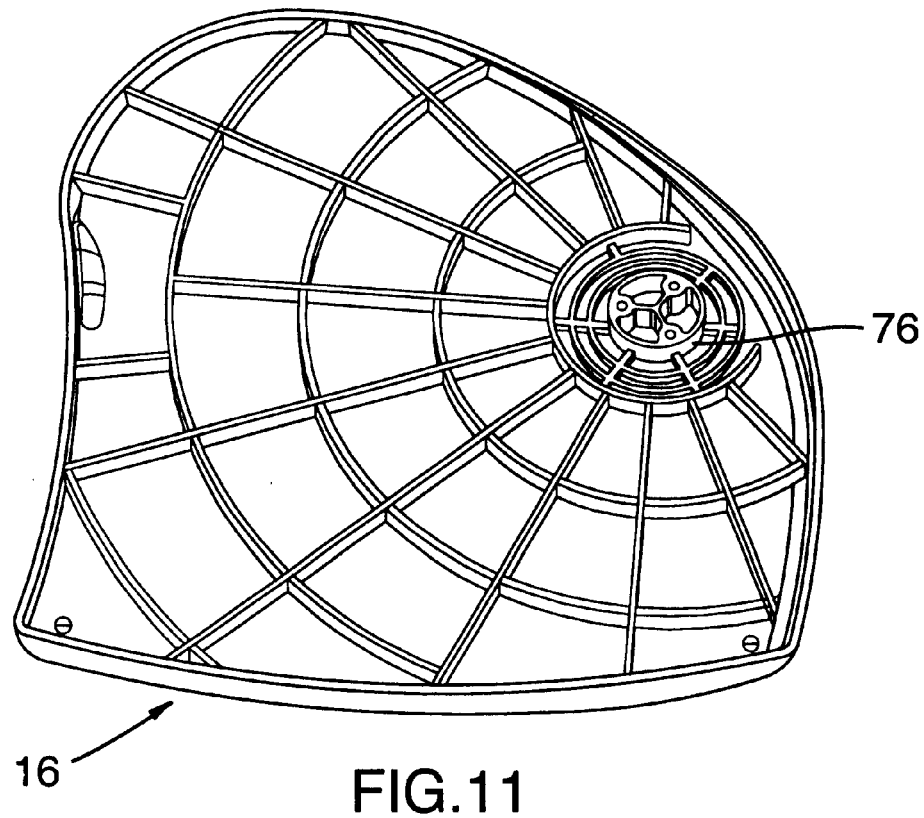
FIGS. 11 and 12 are two pictorial views of the bottom and top of the mouse pad of FIGS. 1 to 6.
Figure 12:
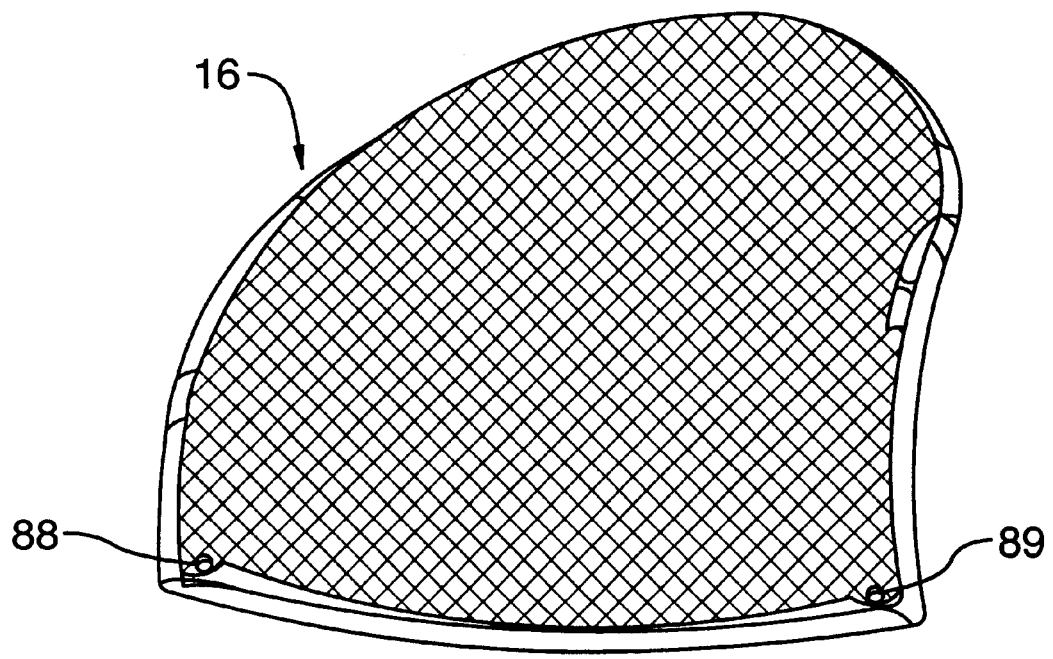

As best seen in FIGS. 11 and 12, the mouse pad 16 is asymmetrical relative its stub axle 76 and therefore asymmetrical relative to the turntable axis 30.

FIG. 2 shows the mouse pad 16 as rotated to a position in which the mouse pad overlies a portion of the keyboard 14. Particularly, a conventional keyboard 14 as shown has on a right hand side thereof a numeric pad 15 comprising a rectangular matrix of numeric keypads. Advantageously, the mouse pad overlies this numeric keypad 15 and provides an ergonomically advantageous location for use of a mouse, however, without interfering with a person using the keys other than those of the numeric keypad 15. The mouse pad 16 may be rotated about the turntable axis 30 to a position in which the mouse pad 16 does not substantially overlie any keys on the keyboard 14 and thus permit all of the keys in the keyboard to be easily used by a user.

As seen in FIG. 1, the mouse pad support 24 extends upwardly from an upwardly directed support surface 20 of the keyboard support tray 12 to locate the mouse pad 16 and particularly under surfaces 90 of the mouse pad 16 at a height sufficiently above the support tray 12 that the keyboard 14 may be located thereunder. Alternatively, the mouse pad 16 may be located so that it is only marginally above the keyboard 14.

A viewed in FIG. 1, the keyboard support tray 12 is adapted for tilting about tray pivot axis 106 and the mouse pad 16 is adapted for pivoting about tilt axis 28 preferably parallel to the tray pivot axis 106. This permits a user to select a tilt angle for the keyboard support tray 12 which is the same as or different than a tilt angle of the mouse pad 16.

The preferred embodiments show the mouse pad tower comprising support 24, bracket 26 and mouse pad 16 as being removably attached to the keyboard support tray 12. It is to be appreciated however that a similar device could independently be attached to a desk top by its own mounting bracket mechanisms including, for example, brackets similar to 100 and an arm similar to 104 for independent attachment. Similarly, the device could independently be attached to a desktop as, for example, by directly securing the support 24 to a desktop or, alternatively, providing a device for securing to a desktop which includes a socket such as 22 to removably receive the support 24.

Many variations and modifications will occur to persons skilled in the art. For example, a socket for the mouse pad support could be provided in a desktop itself or in a pad to be placed on a desk top and receive a keyboard or in an arm for a chair or in a keyboard itself, as for example, in a keyboard of a portable computer or in a conventional keyboard for a desktop use.

Figure 13:
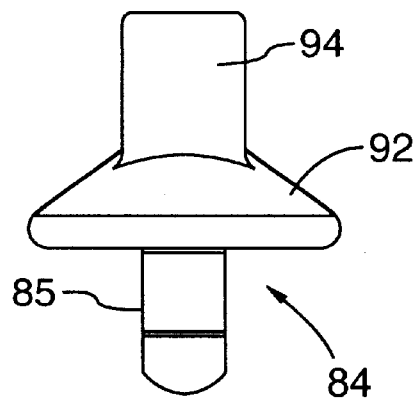
FIGS. 13, 14 and 15 are respectively, side, front and bottom views of a first embodiment of a wire clip.
Figure 14:
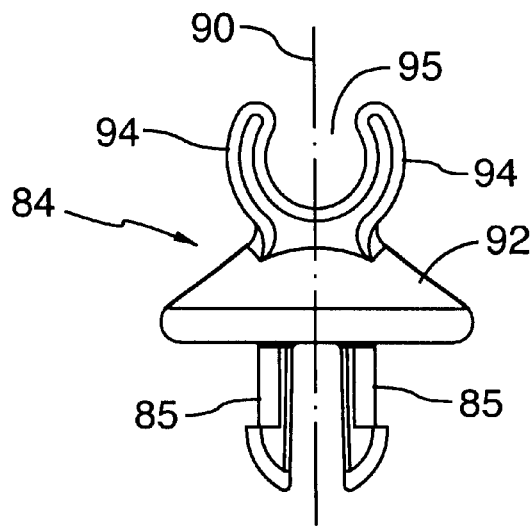
Figure 15:
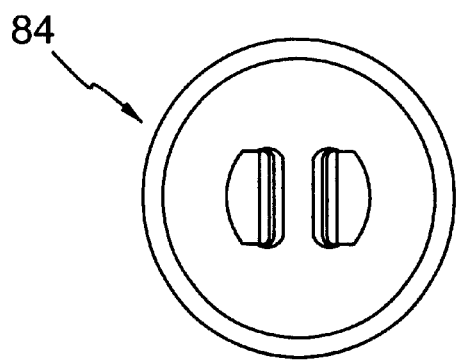

Reference is made to FIGS. 13 to 15 which show a wire clip 84. The wire clip has downwardly extending legs 85 adapted to be received in a snap fit within openings such as 88 and 89 provided on the mouse pad 16. The wire clips 84 as shown are adapted so that with legs 85 received within the openings 88 or 89 to rotate about a clip axis 90. The wire clip 84 includes a skirt portion 92 and a pair of upwardly extending arms 94. The arms form an opening 95 therebetween sized to receive in a friction fit relation the wire 97 which extends from the computer mouse 18. The wire 97 from the mouse 18 can be secured within the opening 95 of wire clip 84. The wire clip 84 provides sufficient slack in the wire between the wire clip and the mouse to permit ease of movement of the mouse on the mouse pad 16.

Reference is made to FIG. 16 which shows an alternate embodiment for the mouse wire clip 84 in a partially exploded view. In the embodiment shown in FIG. 16, the skirt portion 92 is formed with a part spherical socket 96 to receive a ball 98 carrying an upwardly extending arm 99 which bifurcates into the pair of arms 94 serving to clamp on the wire. The improved structure provides for a ball and socket arrangement which permits for increased degrees of movement of the wire clamp and the mouse wire. Various other ball and socket arrangements may be provided as, for example, with the ball 98 being received in a ball socket in the mouse pad itself.

While the invention has been described with reference to preferred embodiments, many modifications and variations will now occur to a person skilled in the art. For a definition of the invention, reference is made to the following claims.

What is claimed is:

1. A computer keyboard support mechanism with a multi-positional mouse pad comprising:

a keyboard support tray adapted to support a keyboard thereon;

a support extending upwardly from the keyboard support tray;

a bracket mounted to the support for pivoting about a generally horizontal tilt axis;

a mouse pad mounted to the bracket for pivoting about a turntable axis generally normal to the tilt axis;

a tilt lock mechanism to releasably lock the bracket against pivoting about the tilt axis relative the support;

a manual release mechanism to manually release the tilt lock mechanism, and a biasing mechanism biasing the tilt lock mechanism to a locked configuration.

2. A mechanism as claimed in claim 1 including a turntable lock mechanism to releasably lock the mouse pad against pivoting about the turntable axis relative the bracket.

3. A mechanism as claimed in claim 1 wherein the manual release mechanism includes a lever carried by the support pivotable about a fulcrum on the support and biased by the biasing mechanism into the locked configuration in which one or more lever catch members carried on the lever adapted to engage one or more tilt catch members carried on the bracket to lock the bracket relative the support at different tilt angles, the lever having one end which is accessible to a user for manual engagement to pivot the lever against the bias of the biasing mechanism to disengage the lever catch members from engagement with the plurality tilt catch members and permit the bracket to be pivoted relative the support member about the tilt axis.

4. A mechanism as claimed in claim 1 in combination with a keyboard having keys including a numeric keypad comprising a rectangular matrix of numeric keys on a right hand side of the keyboard, the keyboard located on the keyboard support tray, the support mounted to a right hand side of the keyboard support tray to the right of the keyboard and locating the mouse pad at a height above the keyboard, the mouse pad extending radially of the turntable axis asymmetrically relative the turntable axis such that the mouse pad may be pivoted about the turntable axis between positions in which the mouse pad overlies the numeric keypad and positions in which the mouse pad does not overlie the numeric keypad.

5. A computer keyboard support mechanism with a multi-positional mouse pad comprising:

a keyboard support tray adapted to support a keyboard thereon;

a support extending upwardly from the keyboard support tray;

a bracket mounted to the support for pivoting about a generally horizontal tilt axis;

a mouse pad mounted to the bracket for pivoting about a turntable axis generally normal to the tilt axis;

the keyboard support tray has two spaced upwardly opening sockets, each adapted to removably receive the support therein.

6. A mechanism as claimed in claim 5 wherein the two sockets comprise a right socket on a right hand side of the keyboard support tray and a left socket on a left hand side of the keyboard support tray, the right socket and left socket spaced a distance at least equal to a width of a keyboard to be received on the keyboard support tray so as to permit removal and insertion of the support from and into both the right socket and the left socket with the keyboard received on the keyboard support tray.

7. A computer keyboard support mechanism with a multi-positional mouse pad comprising:

a keyboard support tray adapted to support a keyboard thereon;

a support extending upwardly from the keyboard support tray;

a bracket mounted to the support for pivoting about a generally horizontal tilt axis;

a mouse pad mounted to the bracket for pivoting about a turntable axis generally normal to the tilt axis;

the keyboard support tray has at least one upwardly opening socket adapted to removably receive the support therein.

8. A mechanism as claimed in claim 7 wherein the keyboard support tray has an upwardly directed surface, the upwardly directed surface being adapted to receive a keyboard thereon and having a keyboard area corresponding to an area to receive a keyboard thereon, the upwardly directed surface having a border area outside the keyboard area, the socket provided on the border area, the socket extending downwardly into the keyboard support tray from the upwardly directed surface about a socket axis generally normal the upwardly directed surface, the support received in the socket extending upwardly therefrom with the mouse pad extending laterally from the support to overlie the keyboard area spaced generally therefrom sufficiently to permit a keyboard to be located under the mouse pad between the mouse pad and the keyboard support surface.

9. A mechanism as claimed in claim 7 including a mounting mechanism for mounting the keyboard support tray to a workstation, the mounting mechanism permitting the keyboard support tray to be movable to various heights and angular positions relative the workstation, the keyboard support tray having a front edge which faces a person using a keyboard located on the keyboard support tray, the front edge means disposed generally horizontal.

10. A mechanism as claimed in claim 7 wherein the mouse pad overlies the support at a height above the support and extends radially from the support to overlie the keyboard support tray.

11. A mechanism as claimed in claim 10 wherein the support overlies the keyboard support tray spaced upwardly therefrom a distance sufficient to receive a keyboard therebetween.

12. A mechanism as claimed in claim 7 wherein the mouse pad extends radially of the turntable axis asymmetrically relative the turntable axis such that the mouse pad may be pivoted about the turntable axis between positions in which the mouse pad overlies an area on the keyboard support tray adapted to receive a keyboard and positions in which the mouse pad does not overlie said area.

13. A mechanism as claimed in claim 7 wherein the keyboard support tray having a keyboard area adapted to receive a keyboard thereon, the socket provided outside the keyboard area.

14. A mechanism as claimed in claim 13 wherein the socket is provided on a right hand side of the keyboard area.

15. A mechanism as claimed in claim 7 wherein the support comprises an elongate member having a plug at a lower end adapted to be received within the socket and an upper body extending from the plug to an upper end, with the plug received in the socket the upper body extends above the keyboard support tray, the bracket journalled to the upper body on an axle member extending transversely of the upper body, the bracket having a side leg extending along one side of the upper body and connected to a top plate of the bracket overlying the upper end of the support, the top plate normal the turntable axis, a turntable mechanism coupling the top plate to the mouse pad for rotation of the mouse pad about the turntable axis.

16. A mechanism as claimed in claim 7 wherein the support having a plug to be removably received in the socket.

17. A mechanism as claimed in claim 7 wherein the socket having a socket axis normal to a surface of the keyboard support tray adapted to receive a keyboard, the support mountable in the socket at different positions pivoted relative the socket axis.

18. A computer keyboard support mechanism with a multi-positional mouse pad comprising:

a keyboard support tray adapted to support a keyboard thereon;

a support extending upwardly from the keyboard support tray;

a bracket mounted to the support for pivoting about a generally horizontal tilt axis;

a mouse pad mounted to the bracket for pivoting about a turntable axis generally normal to the tilt axis;

a tilt lock mechanism to releasably lock the bracket against pivoting about the tilt axis relative the support;

a friction clutch mechanism to prevent pivoting of the mouse pad relative to the bracket about the turntable axis under rotational forces attempting to rotate the mouse pad about the turntable axis less than a minimal rotational force.

19. A computer keyboard support mechanism with a multi-positional mouse pad comprising:

a keyboard support tray adapted to support a keyboard thereon;

the keyboard support tray having an upwardly directed surface, the upwardly directed surface being adapted to receive a keyboard thereon, the upwardly directed surface having a keyboard area corresponding to an area to receive a keyboard thereon and a border area outside the keyboard area, an elongate mouse pad support having a lower end and an upper end, the support having its lower end removably secured to the keyboard support tray in the border area with the support extending upwardly from the border area about an axis generally normal to the upwardly directed surface of the keyboard support tray to the upper end of the support, a mouse pad mounted to the upper end of the support and extending laterally from the support to overlie the keyboard area, the support having a length from its lower end to its upper end which spaces the mouse pad upwardly from the keyboard area sufficiently to permit a keyboard to be located under the mouse pad between the mouse pad and the keyboard support surface.

20. A computer keyboard support mechanism as claimed in claim 19 wherein the mouse pad is mounted to the upper end of the support for pivoting about a generally horizontal tilt axis and for pivoting about a turntable axis generally normal to the tilt axis.

21. A computer keyboard support mechanism as claimed in claim 19 wherein a bracket mounted to the upper end of the support for pivoting about a generally horizontal tilt axis; and the mouse pad is mounted to the bracket for pivoting about a turntable axis generally normal to the tilt axis.

* * * * *